(12) United States Patent
Little et al.

(10) Patent No.: US 7,934,523 B2
(45) Date of Patent: May 3, 2011

(54) TREE COUNTER FOR A SAW HEAD IN A TREE FELLER

(75) Inventors: Elliot Little, Bettendorf, IA (US); Mark Breutzman, Potosi, WI (US); Karle Wigginton, Dubuque, IA (US)

(73) Assignee: Deere & Company, Moline, IL (US)

( * ) Notice: Subject to any disclaimer, the term of this patent is extended or adjusted under 35 U.S.C. 154(b) by 564 days.

(21) Appl. No.: 11/872,363

(22) Filed: Oct. 15, 2007

(65) Prior Publication Data

US 2009/0095375 A1 Apr. 16, 2009

(51) Int. Cl.
*A01G 23/08* (2006.01)
(52) U.S. Cl. ............... 144/4.1; 144/335; 144/336
(58) Field of Classification Search .......... 144/4.1, 144/24.13, 34.1, 382, 391, 392, 394, 402, 144/403; 56/10.2, 13.3, 14.7, 15.5
See application file for complete search history.

(56) References Cited

U.S. PATENT DOCUMENTS

| | | | | |
|---|---|---|---|---|
| 3,513,321 A * | 5/1970 | Sherman | ................. | 250/559.25 |
| 4,353,199 A * | 10/1982 | Chow et al. | ................ | 460/2 |
| 4,637,289 A * | 1/1987 | Ramsden | ................ | 83/380 |
| 4,984,961 A * | 1/1991 | Herolf | ................. | 414/812 |
| 5,148,843 A * | 9/1992 | Cote | ................. | 144/24.13 |
| 6,014,996 A * | 1/2000 | Egging et al. | ................ | 144/334 |
| 6,041,683 A * | 3/2000 | Timperi et al. | ................. | 83/76 |
| 6,186,198 B1 * | 2/2001 | Holmes | ................ | 144/34.1 |
| 6,272,819 B1 * | 8/2001 | Wendte et al. | ................. | 56/11.9 |
| 6,318,425 B1 * | 11/2001 | Niemi | ................ | 144/343 |
| 6,644,004 B2 * | 11/2003 | Reimers et al. | ................. | 56/14.7 |
| 6,839,616 B2 * | 1/2005 | Beck | ................. | 701/50 |
| 7,011,124 B1 * | 3/2006 | Morey | ................ | 144/334 |
| 7,016,799 B2 * | 3/2006 | Dondi | ................. | 702/104 |
| 7,289,873 B2 * | 10/2007 | Redecker et al. | ............ | 700/174 |
| 2002/0040741 A1 * | 4/2002 | Ristolainen | ................ | 144/4.1 |
| 2002/0079022 A1 * | 6/2002 | Colle | ................. | 144/382 |
| 2004/0207247 A1 * | 10/2004 | Jackson et al. | ............. | 299/85.1 |
| 2004/0251730 A1 * | 12/2004 | Steffen et al. | ............. | 299/1.05 |

* cited by examiner

*Primary Examiner* — Dana Ross
*Assistant Examiner* — Jennifer Chiang
(74) *Attorney, Agent, or Firm* — Taylor IP, P.C.

(57) ABSTRACT

A forestry machine includes a frame, and a felling saw carried by the frame. The felling saw includes a saw head. A tree counter associated with the saw head includes an audio sensor providing an output signal representing an audio parameter associated with a cutting action of the saw head. An electrical processing circuit is coupled with and receives the output signal from the audio sensor. The electrical processing circuit determines a tree count associated with the saw head, dependent upon the output signal from the audio sensor.

12 Claims, 3 Drawing Sheets

TREE COUNTER FOR A SAW HEAD IN A TREE FELLER

FIELD OF THE INVENTION

The present invention relates to forestry machinery, and, more particularly, to an indicator for indicating a number of trees cut using a felling saw in a tree feller.

BACKGROUND OF THE INVENTION

Forestry machines in the form of disk saw felling heads (DSFH, which includes wheeled feller bunchers and tracked feller bunchers) have a saw head at the front end of the machine with a spinning disk at the bottom of the saw head. A plurality of cutting teeth are mounted to the periphery of the spinning disk at spaced apart intervals. The disk is massive and acts as a flywheel which is spun up to operating speed by a hydraulic pump and motor circuit. The saw cuts trees by kinetic energy, not hydraulic power. Thus, rotational speed of the disk is needed and recovery of rotational speed is important to the ability to cut the next tree. Cutting pulls down the speed of the saw by using energy.

Users of DSFH desire a reliable and automatic way to count trees that are cut. Existing methods of counting trees require manual input or are not highly accurate. Typical automatic methods include either monitoring clamp cycles or saw speed pulldown, or a combination of both. The current estimated accuracy of such tree counting systems is approximately 80%.

Monitoring clamp cycles produces inaccuracy because operators sometimes cycle the clamps for reasons other than tree harvesting (such as repositioning of trees on the ground, adjusting the grip on existing trees in the head, etc.). Monitoring saw speed pulldown produces inaccuracy because trees below a certain diameter do not decelerate the saw enough for the system to reliably register a cut.

What is needed in the art is a feller buncher with an accurate and reliable indicator of how many trees have been cut.

SUMMARY OF THE INVENTION

The invention in one form is directed to a forestry machine including a frame, and a felling saw carried by the frame. The felling saw includes a saw head. A tree counter associated with the saw head includes an audio sensor providing an output signal representing an audio parameter associated with a cutting action of the saw head. An electrical processing circuit is coupled with and receives the output signal from the audio sensor. The electrical processing circuit determines a tree count associated with the saw head, dependent upon the output signal from the audio sensor.

The invention in another form is directed to a method of counting trees cut with a felling saw in a forestry machine, including the steps of: sensing an audio parameter associated with a cutting action of a saw head in the felling saw; and determining a tree count associated with the saw head, dependent upon the sensed audio parameter.

DETAILED DESCRIPTION OF THE INVENTION

Figure 1:
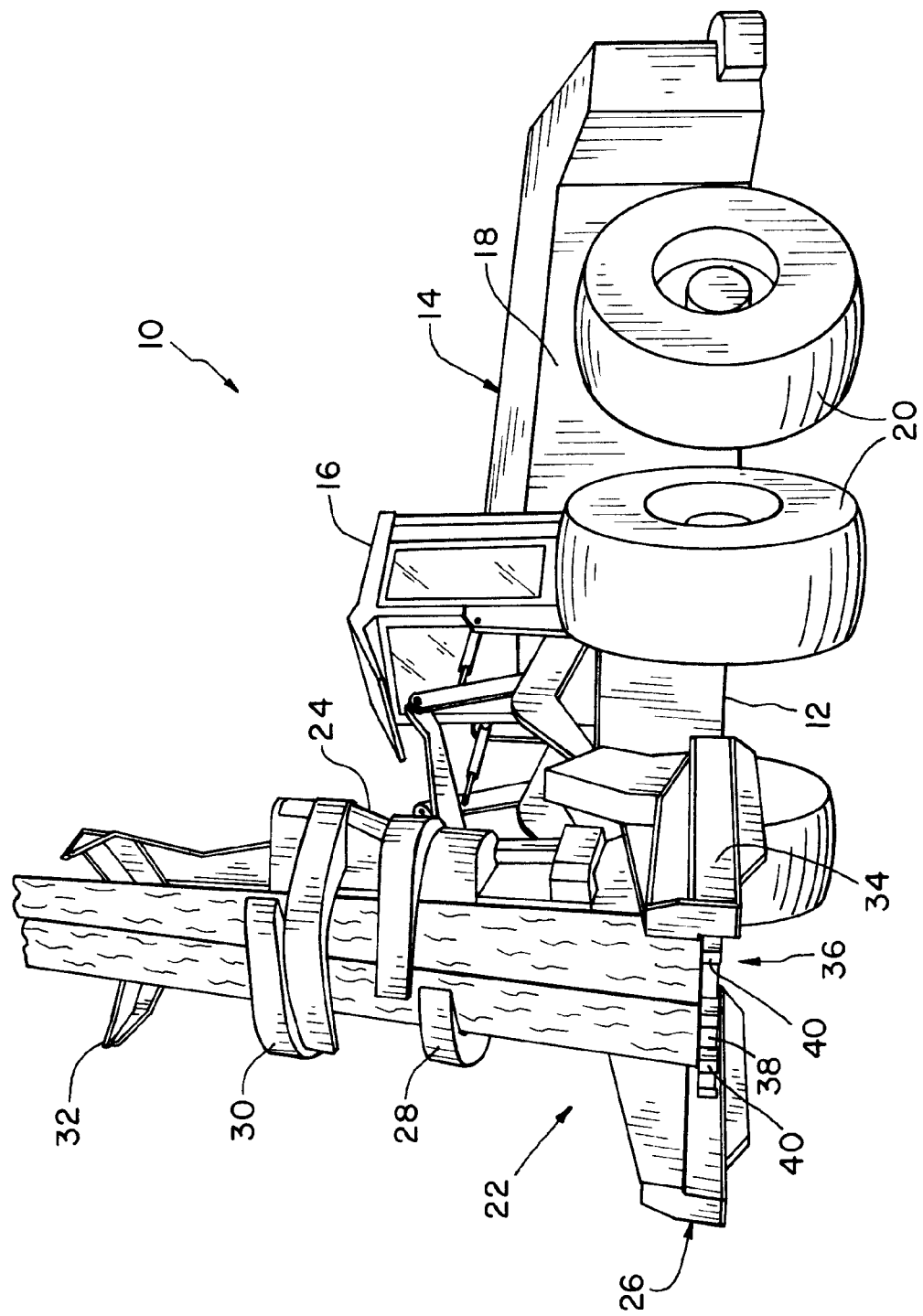
FIG. 1 is a front, perspective view of a forestry machine including an embodiment of a tree counter of the present invention.

Referring now to the drawings, and more particularly to FIG. 1, there is shown an embodiment of a forestry machine 10 of the present invention. In the embodiment shown, forestry machine 10 is in the form of a Model 643J wheeled feller buncher manufactured by the assignee of the present invention. In general, feller buncher 10 cuts, accumulates and transports to a staging area a number of trees in an area to be harvested. Of course, it will be appreciated that forestry machine 10 can be in the form of a differently configured forestry harvesting machine, such as a different wheeled or track type feller buncher.

In general, feller buncher 10 includes a vehicle frame 12 carrying a body 14, including an operator's station 16 and engine compartment 18. Frame 12 can be variably configured depending upon the application, such as a multi-piece frame for articulated steering (as shown), etc. Wheels 20 are coupled with and supported by frame 12. A felling saw 22 is mounted to the front end of frame 12 and is manipulated using appropriate hydraulic cylinders controlled from within operator's station 16, such as for lifting, tilting, rotating, etc.

Felling saw 22 includes a main beam 24 carrying a saw head 26, accumulator arms 28, gathering arms 30 and horn 32. Accumulator arms 28, gathering arms 30 and horn 32 are of conventional design and not described further herein. Saw head 26 includes a housing 34 and a rotating saw 36. Saw 36 includes a massive rotating disk 38 with a plurality of cutting teeth 40 spaced apart around the periphery thereof for cutting a selected tree. Rotating disk 38 is positioned and rotates below a stationary shelf (not specifically visible in FIG. 1). Teeth 40 extend upwardly around the edge of the stationary shelf so that the trees may be effectively cut and placed upon the shelf. Saw 36 is driven by a hydraulic motor (not shown). During operation, the trees are cut with saw 36 and positioned on top of the non-rotating shelf, and are gathered and accumulated on felling saw 22 using gathering arms 30 and accumulator arms 28.

According to an aspect of the present invention, feller buncher 10 also includes a tree counter 50 associated with felling saw 22 for indicating a number of trees that have been cut during a harvesting operation using saw head 26.

Figure 2:
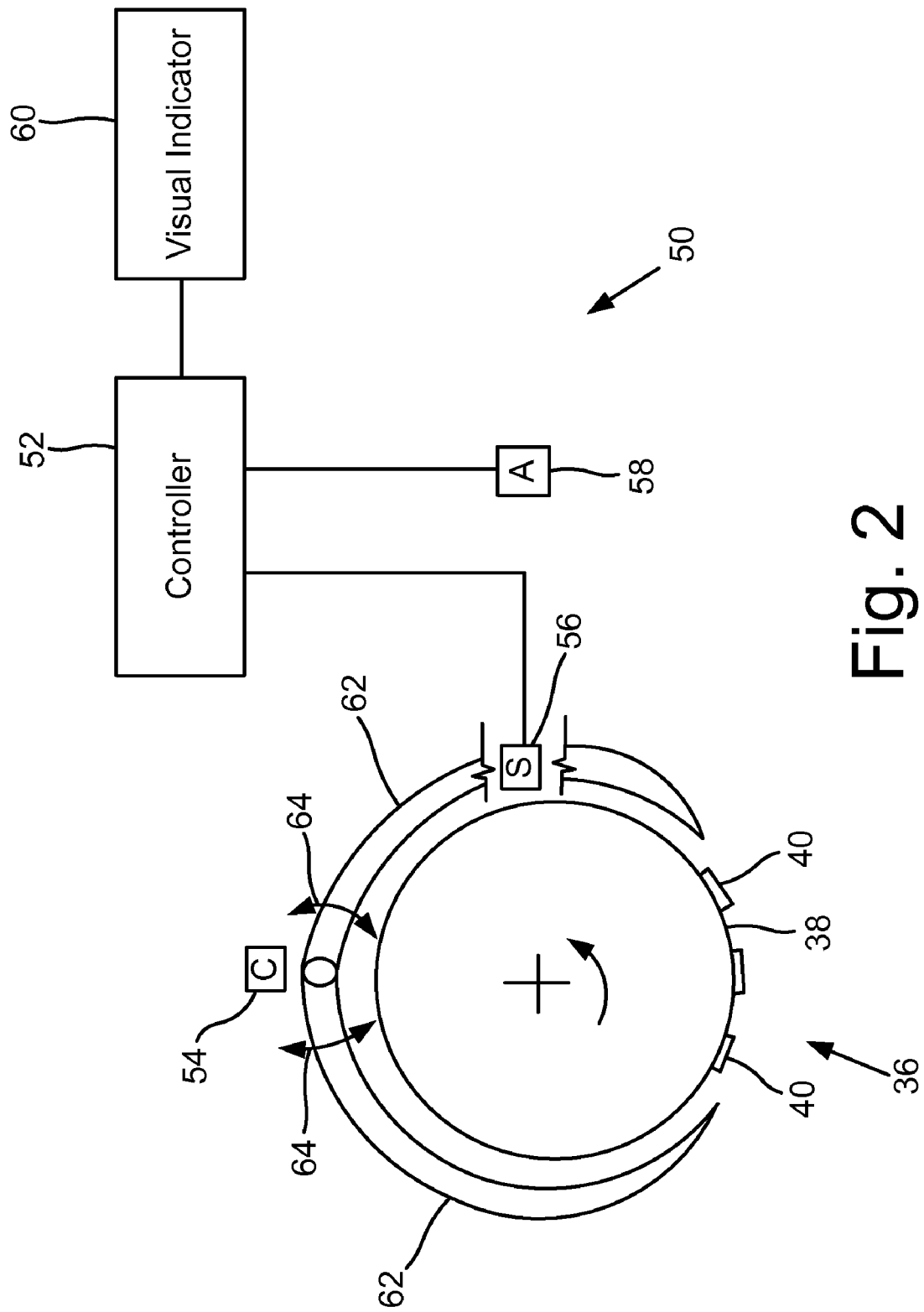
FIG. 2 is a schematic view of an embodiment of the tree counter of the present invention.

Referring to FIG. 2, tree counter 50 includes a controller 52 which is operatively coupled with a clamp sensor 54, speed sensor 56, audio sensor 58 and visual indicator 60. Controller 52 receives the output signals from sensor(s) 54, 56 and/or 58 and provides output signals to visual indicator 60. Controller 52 is typically located within operator's station 16, but may be located elsewhere on feller buncher 10, such as within engine compartment 18. Controller 52 may be a stand alone controller or may be incorporated into a controller used for other functions. To that end, it will be appreciated that the logic used for tree counter 50 may be accomplished with any desired combination of electronic hardware and/or software. Moreover, although the various electrical connections are shown as hardwired connections, it is also to be understood that the various electrical components of tree counter 50 could be connected in a wireless manner, depending on the application.

Clamp sensor 54 detects a clamp cycle of accumulator arms 28 and/or gathering arms 30, depending on the application. To that end, for purposes of description herein, accumulator arms 28 and/or gathering arms 30 could each be viewed as "clamp arms" 62 (shown generically in FIG. 2) for detecting a clamp cycle associated with felling saw 22. Clamp arms 62 are pivotable under operator control about a pivot point between open and closed positions, as indicated by arrows 64. Movement during a clamp cycle of clamp arms 62 causes clamp sensor 54 to output a corresponding signal to controller 52.

Speed sensor 56, in the embodiment shown, is in the form of a single sensor configured as a magnetic pick up sensor which provides an output signal to controller 52 representing a rotational speed of saw 36. Other types of sensors providing an output signal representing a rotational speed of saw 36 may also be used, such as optical sensors, etc.

Audio sensor 58 senses an audio parameter associated with a cutting action of saw head 26, and provides a corresponding output signal to controller 52 representing the audio parameter. Audio sensor 58 could be configured, e.g., as a simple microphone providing an audio signal to controller 52.

Visual indicator 60 is configured and positioned within operator's station 16 to provide an easy way for an operator to determine a number of trees that have been cut using saw 36. Visual indicator 60 is preferably positioned toward the front of operator's station 16 in an area of direct or peripheral vision of the operator. In the embodiment shown, visual indicator 60 is assumed to be a liquid crystal display (LCD) providing a digital readout to an operator, but could be differently configured.

During operation, clamp sensor 54, speed sensor 56 and audio sensor 58 each provide output signals to controller 52. The sound of a cutting action is a distinct sound, which broadly can be characterized by the amplitude and frequency of the audio signals which are outputted from audio sensor 58 to controller 52. This sound can vary somewhat depending upon the particular configuration of saw head 26 (e.g., the size and material type of teeth 40, rotational operating speed of disk 38, etc.), but can be relatively easily empirically determined based upon the amplitude and frequency of the series or pattern of audio signals which are received by controller 52. Controller 52 compares the audio signals with a predetermined pattern of signals stored in a memory to determine if a tree is being cut, resulting in a "match". This Boolean match for the sound of a tree being cut is then combined with a detection of saw speed pulldown and/or clamp cycle to determine if a tree has been cut.

Figure 3:
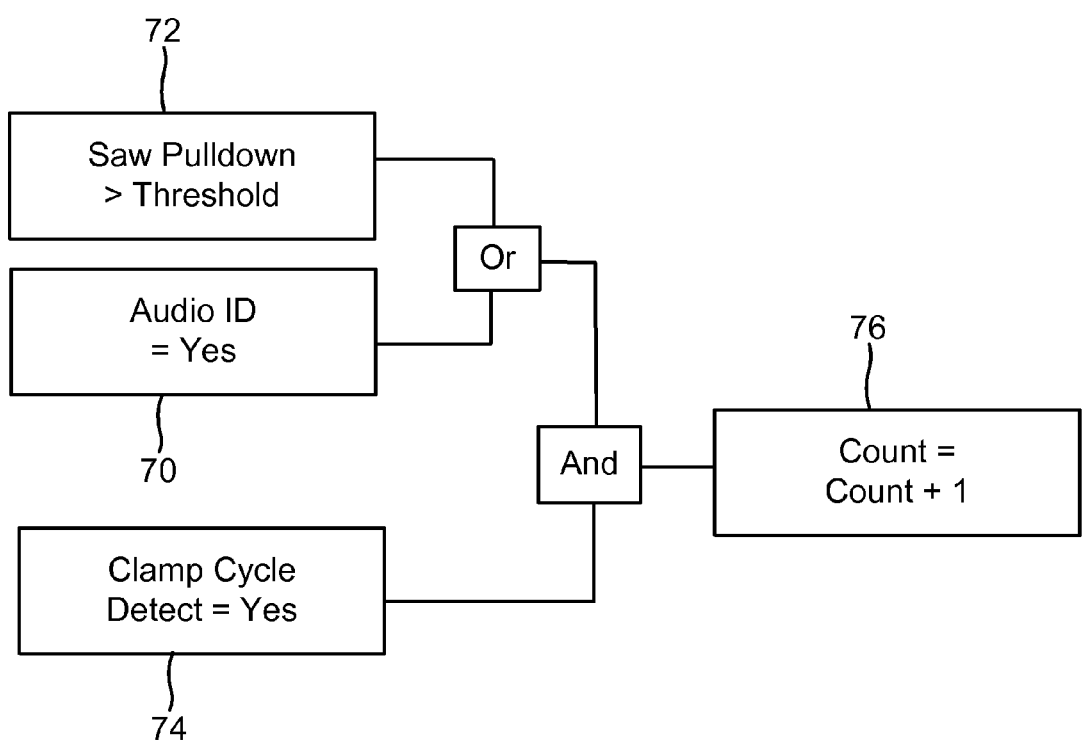
FIG. 3 is a diagrammatic illustration of an embodiment of the Boolean logic carried out using the tree counter of FIG. 2.

Referring to FIG. 3, in the particular embodiment shown, a Boolean "OR" operation is carried out by controller 52 using either the audio ID of a tree being cut from audio sensor 58 (block 70) or a saw speed pulldown below a threshold value using speed sensor 54 (block 72). If either of these conditions occurs, then the resultant signal is then combined in a Boolean "AND" operation with a clamp cycle signal from clamp sensor 54 (block 74) to ensure that an operator had manipulated a tree during what appeared to be a cutting action of saw head 26. If a clamp cycle occurred, the combination of the clamp cycle and the audio ID or saw speed pulldown is then sufficient to assume that a cutting action occurred, and the value "COUNT" is incremented by one (block 76). This methodology provides a more accurate and reliable tree count indication than previously possible.

Having described the preferred embodiment, it will become apparent that various modifications can be made without departing from the scope of the invention as defined in the accompanying claims.

The invention claimed is:

1. A forestry machine, comprising:
 a frame;
 a felling saw carried by said frame, said felling saw including a saw head; and
 a tree counter associated with said saw head, said tree counter including:
  an audio sensor providing an output signal representing an audio parameter associated with a cutting action of said saw head; and
  an electrical processing circuit coupled with and receiving said output signal from said audio sensor, said electrical processing circuit determining a tree count associated with said saw head, dependent upon said output signal.

2. The forestry machine of claim 1, wherein said audio parameter comprises at least one of an amplitude and a frequency of an audio signal received at said audio sensor during a cutting action of said saw head.

3. The forestry machine of claim 1, including a speed sensor providing an output signal corresponding to an approximate rotational speed of said saw head, said electrical processing circuit receiving said output signal from said speed sensor, said electrical processing circuit determining said tree count associated with said saw head, dependent upon each of said output signal from said audio sensor and said output signal from said speed sensor.

4. The forestry machine of claim 3, wherein said speed sensor includes a magnetic pick up sensor associated with said saw head.

5. The forestry machine of claim 1, including a clamp sensor providing an output signal corresponding to a clamp cycle of said saw head, said electrical processing circuit receiving said output signal from said clamp sensor, said electrical processing circuit determining said tree count associated with said saw head, dependent upon each of said output signal from said audio sensor and said output signal from said clamp sensor.

6. The forestry machine of claim 5, including a speed sensor providing an output signal corresponding to an approximate rotational speed of said saw head, said electrical processing circuit receiving said output signal from said speed sensor, said electrical processing circuit determining said tree count associated with said saw head, dependent upon each of said output signal from said audio sensor, said output signal from said speed sensor, and said output signal from said clamp sensor.

7. A tree counter for a felling saw in a forestry machine, comprising:
 an audio sensor providing an output signal representing an audio parameter associated with a cutting action of a saw head in the felling saw; and
 an electrical processing circuit coupled with and receiving said output signal from said audio sensor, said electrical processing circuit determining a tree count associated with said saw head, dependent upon said output signal.

8. The tree counter of claim 7, wherein said audio parameter comprises at least one of an amplitude and a frequency of an audio signal received at said audio sensor during a cutting action of said saw head.

9. The tree counter of claim 7, including a speed sensor providing an output signal corresponding to an approximate rotational speed of said saw head, said electrical processing circuit receiving said output signal from said speed sensor, said electrical processing circuit determining said tree count associated with said saw head, dependent upon each of said output signal from said audio sensor and said output signal from said speed sensor.

10. The tree counter of claim 9, wherein said speed sensor includes a magnetic pick up sensor associated with said saw head.

11. The tree counter of claim 7, including a clamp sensor providing an output signal corresponding to a clamp cycle of said saw head, said electrical processing circuit receiving said output signal from said clamp sensor, said electrical processing circuit determining said tree count associated with said saw head, dependent upon each of said output signal from said audio sensor and said output signal from said clamp sensor.

12. The tree counter of claim 11, including a speed sensor providing an output signal corresponding to an approximate rotational speed of said saw head, said electrical processing circuit receiving said output signal from said speed sensor, said electrical processing circuit determining said tree count associated with said saw head, dependent upon each of said output signal from said audio sensor, said output signal from said speed sensor, and said output signal from said clamp sensor.

* * * * *